United States Patent
Matsuyama et al.

(10) Patent No.: US 11,031,856 B2
(45) Date of Patent: Jun. 8, 2021

(54) VIBRATION ACTUATOR

(71) Applicants: Takanori Matsuyama, Tokyo (JP); Shinya Tashima, Tokyo (JP); Koichi Azumai, Tokyo (JP); Katsuhiro Hashimoto, Tokyo (JP)

(72) Inventors: Takanori Matsuyama, Tokyo (JP); Shinya Tashima, Tokyo (JP); Koichi Azumai, Tokyo (JP); Katsuhiro Hashimoto, Tokyo (JP)

(73) Assignee: MINEBEA MITSUMI, INC., Nagano (JP)

( * ) Notice: Subject to any disclaimer, the term of this patent is extended or adjusted under 35 U.S.C. 154(b) by 0 days.

(21) Appl. No.: 16/288,202

(22) Filed: Feb. 28, 2019

(65) Prior Publication Data

US 2019/0267881 A1    Aug. 29, 2019

(30) Foreign Application Priority Data

Feb. 28, 2018    (JP) .............................. JP2018-035773

(51) Int. Cl.
*H02K 33/18*     (2006.01)
*H02K 33/16*     (2006.01)
*G08B 6/00*      (2006.01)

(52) U.S. Cl.
CPC ............. *H02K 33/18* (2013.01); *H02K 33/16* (2013.01); *G08B 6/00* (2013.01)

(58) Field of Classification Search
CPC ........ H02K 33/02; H02K 33/16; H02K 33/18; H02K 5/02; H02K 5/04; H02K 35/02; H02K 35/04; B06B 1/045
See application file for complete search history.

(56) References Cited

U.S. PATENT DOCUMENTS

2006/0244400 A1* 11/2006 Miura ..................... B06B 1/045
                                                  318/128
2011/0187209 A1*  8/2011 Pu .......................... H02K 33/04
                                                   310/17

(Continued)

FOREIGN PATENT DOCUMENTS

JP       10-117472 A       5/1998
JP     2009028642 A   *   2/2009 ............. B06B 1/045

(Continued)

OTHER PUBLICATIONS

Machine Translation of KR101130064, Mar. 2012 (Year: 2012).*

(Continued)

*Primary Examiner* — Quyen P Leung
*Assistant Examiner* — Eric Johnson
(74) *Attorney, Agent, or Firm* — Brundidge & Stanger, P.C.

(57) ABSTRACT

A vibration actuator, includes: a movable body including a magnet; a fixing body including a coil; and an elastic support portion supporting the movable body, in which: the fixing body includes: a first fixing body disposed on one side of a vibration direction so as to cover the movable body, and a second fixing body that is bonded to the first fixing body and being configured to accommodate the movable body in such a way that the movable body is capable of vibrating, in which: the elastic support portion is a plate-shaped elastic body that includes one end portion fixed to the movable body and is provided to protrude from an outer periphery of the movable body in a radial direction, and another end portion of the elastic support portion is fixed while being sandwiched between the first fixing body and the second fixing body.

6 Claims, 12 Drawing Sheets

(56) References Cited

U.S. PATENT DOCUMENTS

| | | | |
|---|---|---|---|
| 2011/0309692 A1* | 12/2011 | Park | H02K 33/16 310/25 |
| 2013/0187502 A1* | 7/2013 | Kim | H02K 33/18 310/152 |
| 2013/0278084 A1* | 10/2013 | Furuichi | H02K 33/00 310/25 |
| 2014/0252890 A1* | 9/2014 | Lee | H02K 33/16 310/25 |
| 2014/0375147 A1* | 12/2014 | Takeda | H02K 41/0356 310/12.16 |
| 2016/0172950 A1* | 6/2016 | Shim | H02K 33/16 310/25 |

FOREIGN PATENT DOCUMENTS

| | | | | |
|---|---|---|---|---|
| JP | 2015091189 | A | | 5/2015 |
| JP | 2016144250 | A | | 8/2016 |
| KR | 20110099471 | A | * | 9/2011 |
| KR | 101130064 | B1 | * | 3/2012 |
| KR | 20140073727 | A | * | 6/2014 |
| WO | 2009014188 | A1 | | 1/2009 |
| WO | WO-2015032012 | A1 | * | 3/2015 ............. H02K 33/18 |

OTHER PUBLICATIONS

Kim, Machine Translation of KR20140073727, Jun. 2014 (Year: 2014).*

Song, Machine Translation of KR20110099471, Sep. 2011 (Year: 2011).*

Aoyama, Machine Translation of JP2009028642,Feb. 2009 (Year: 2009).*

Wang, Machine Translation of WO2015032012, Mar. 2015 (Year: 2015).*

Extended European Search Report for EP19159695.6 dated Jul. 17, 2019, 9 pages.

* cited by examiner

VIBRATION ACTUATOR

CROSS REFERENCE TO RELATED APPLICATIONS

This application is entitled to (or claims) the benefit of Japanese Patent Application No. 2018-035773, filed on Feb. 28, 2018, the disclosure of which including the specification, drawings and abstract is incorporated herein by reference in its entirety.

TECHNICAL FIELD

The present invention relates to a vibration actuator.

BACKGROUND ART

In the related art, a vibration actuator, which is a vibration generation source, is mounted on a mobile device having a vibration function. By driving the vibration actuator to transmit vibration to a user, the user can be notified of an incoming call, or feeling of operation or sensation of reality can be improved. Herein, the mobile device includes a mobile communication terminal such as a mobile phone and a smart phone, a mobile information terminal such as a tablet PC, a mobile game terminal, a stationary game machine controller (a game pad), and a wearable terminal attached to clothes and an arm.

As a miniaturized vibration actuator, for example, a vibration actuator used in a pager or the like is known, as disclosed in PTL 1.

In the vibration actuator, a pair of plate-shaped elastic bodies is supported by a frame to oppose each other, and a yoke to which a magnet is attached is fixed and supported by a risen middle part of one plate-shaped elastic body having a spiral shape. The yoke configures a magnetic field generator with the magnet, a coil attached to the other plate-shaped elastic body is disposed in the magnetic field generator. A current having a different frequency is switched and applied to the coil through an oscillation circuit, and the pair of plate-shaped elastic bodies is selectively resonated to generate vibration. Consequently, the yoke vibrates in a center axis direction of the frame.

CITATION LIST

Patent Literature

PTL 1
Japanese Patent Application Laid-Open No. 10-117472

SUMMARY OF INVENTION

Technical Problem

However, since the mobile device having a vibration function is required to give a user sufficient vibration that is actually felt, there is a call for a vibration actuator which is assembled with a simpler configuration than that of the vibration actuator disclosed in PTL 1, as a vibration actuator that gives stronger vibration.

An object of the present invention is to provide a vibration actuator that is easily assembled with a simple configuration and can realize desired vibration output.

Solution to Problem

In order to achieve the object mentioned above, the present invention provides a vibration actuator, including: a movable body including one of a coil and a magnet disposed on a radially inner side of the coil while being spaced from the coil; a fixing body including the other one of the coil and the magnet; and an elastic support portion supporting the movable body in such a way that the movable body is freely movable with respect to the fixing body, in which the movable body vibrates with respect to the fixing body in a magnetization direction of the magnet in cooperation with the coil to which power is supplied and the magnet, in which: the fixing body includes: a first fixing body disposed on one side of a vibration direction so as to cover the movable body, and a second fixing body that is disposed on a side of the other one of the vibration direction so as to cover the movable body, the second fixing body being bonded to the first fixing body and being configured to accommodate the movable body in such a way that the movable body is capable of vibrating, in which: the elastic support portion is a plate-shaped elastic body that includes one end portion fixed to the movable body and is provided to protrude from an outer periphery of the movable body in a radial direction, and another end portion of the elastic support portion is fixed while being sandwiched between the first fixing body and the second fixing body.

Advantageous Effects of Invention

According to the present invention, assembly is easy with a simple configuration and desired vibration output can be realized.

DESCRIPTION OF EMBODIMENTS

Hereinafter, an embodiment of the present invention will be described in detail with reference to the drawings.

Figure 1:
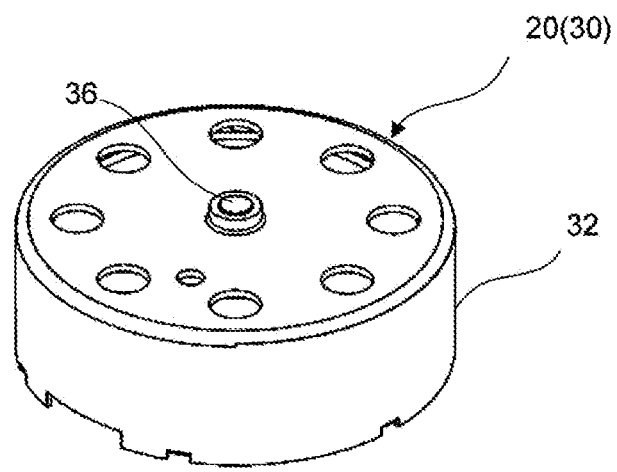
FIG. 1 is a perspective view of a vibration actuator according to an embodiment of the present invention.
Figure 2:
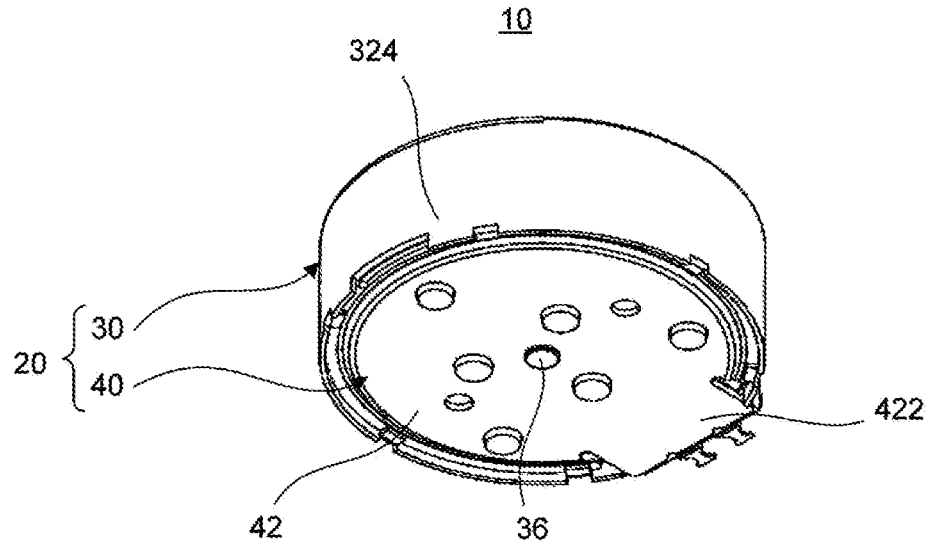
FIG. 2 is bottom surface side perspective view of the vibration actuator.
Figure 3:
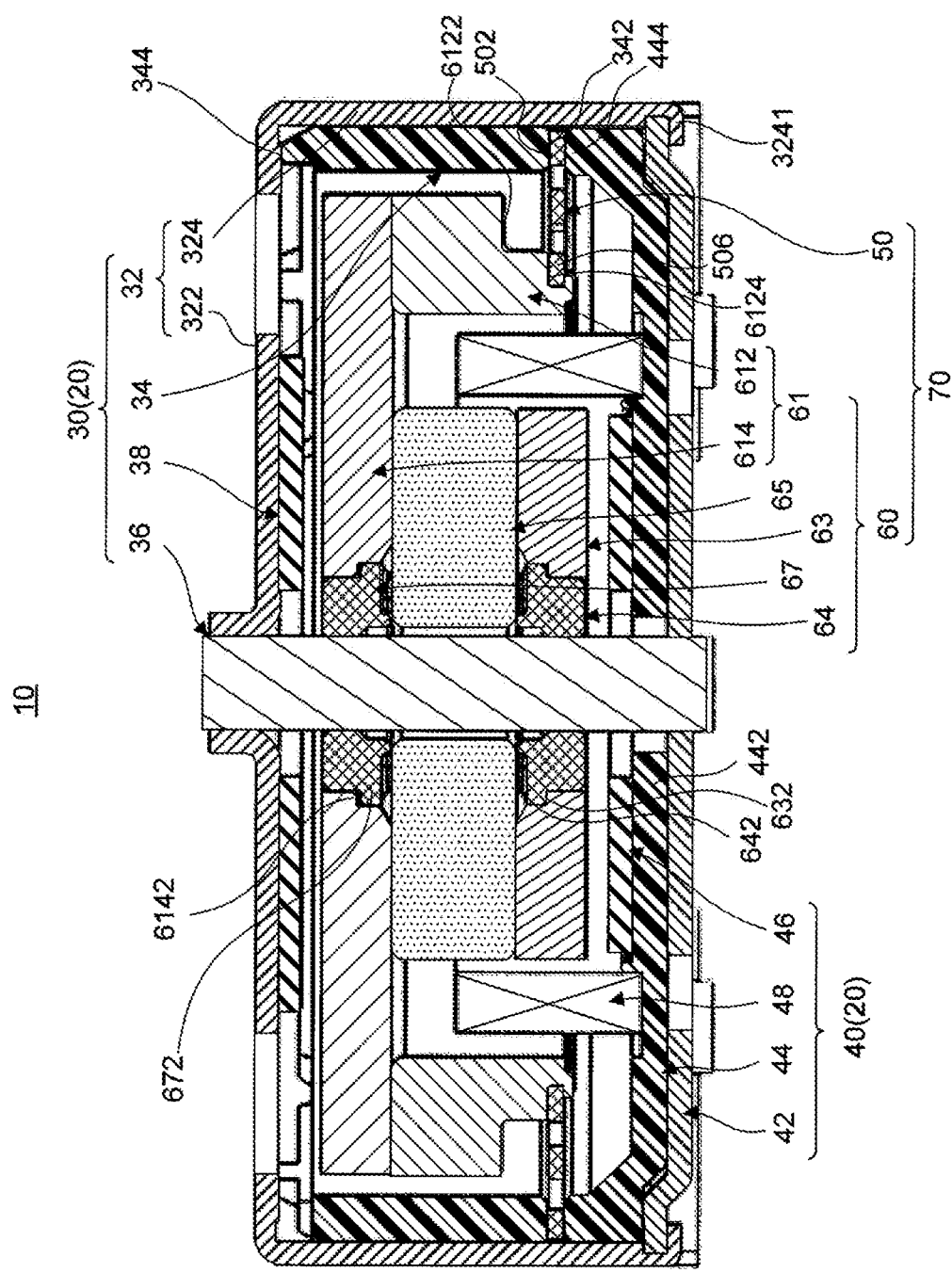
FIG. 3 is a schematic sectional view illustrating a configuration of important portions of the vibration actuator.
Figure 4:
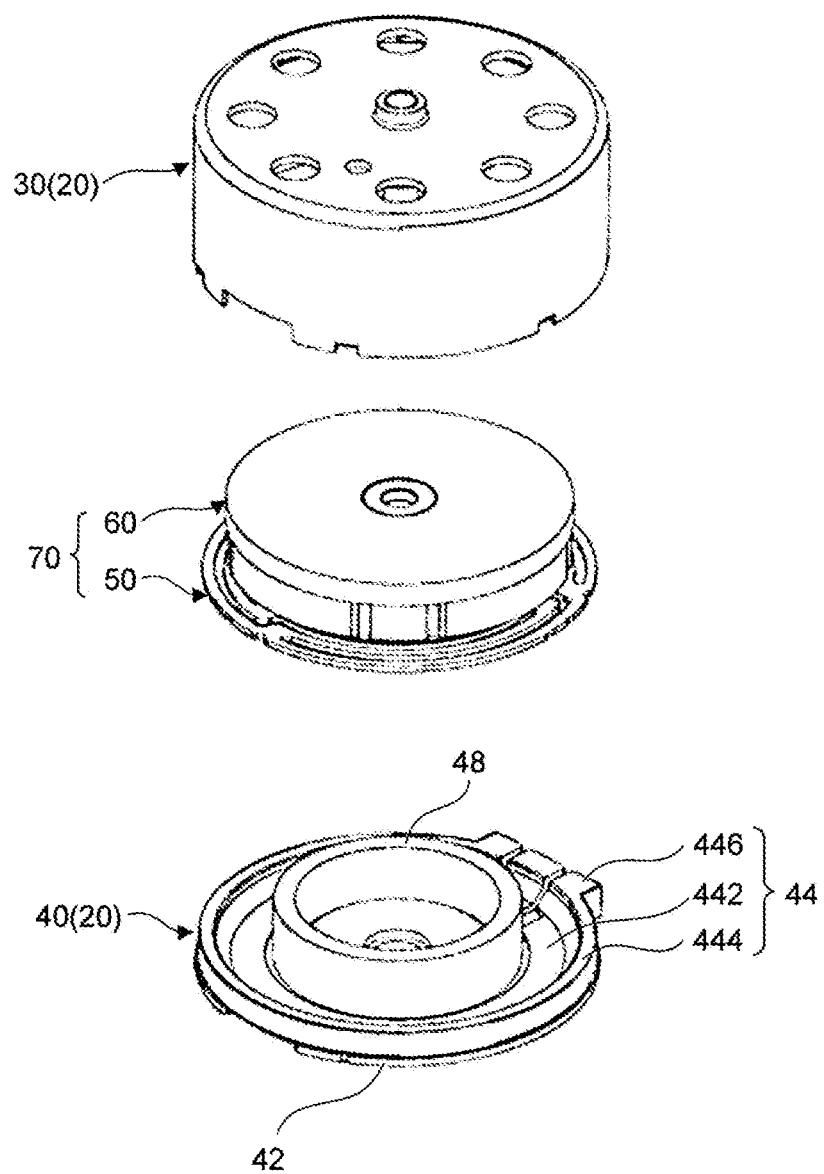
FIG. 4 is an upper surface side exploded view illustrating a fixing body and a movable body in the vibration actuator.
Figure 5:
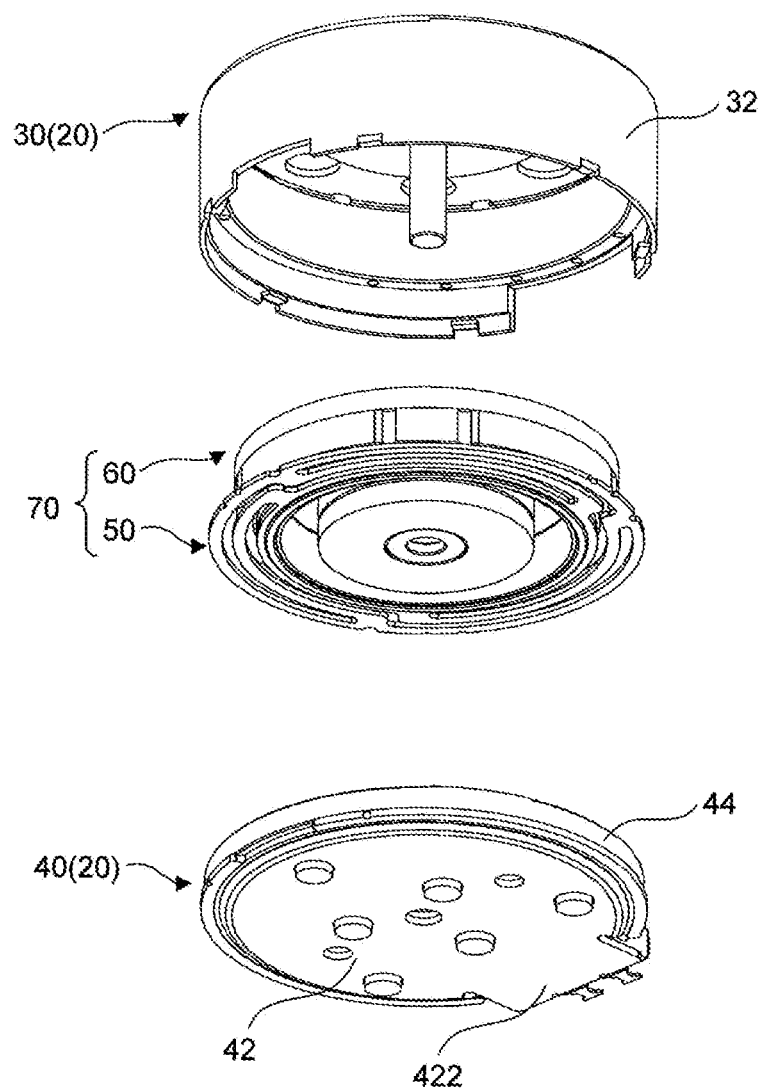
FIG. 5 is a bottom surface side exploded view illustrating the fixing body and the movable body in the vibration actuator.

FIG. 1 is a perspective view illustrating vibration actuator 10 according to Embodiment of the present invention, FIG. 2 is a bottom surface side perspective view of this vibration actuator 10, and FIG. 3 is a schematic sectional view illustrating a configuration of important portions of this vibration actuator 10. In addition, FIGS. 4 and 5 are an upper surface side exploded view and a bottom surface side exploded view, both of which illustrate fixing body 20 and movable body 60 in this vibration actuator 10. An "upper" side and a "lower" side in Embodiment are given for convenience of description in order to facilitate understanding, and respectively mean one direction and the other direction of a vibration direction of movable body 60 (refer to FIG. 3) in vibration actuator 10. That is, when mounting vibration actuator 10 onto a device, the upper side and the lower side may be reversed or may be the right and the left.

Vibration actuator 10 illustrated in FIGS. 1 and 2 is mounted as a vibration generation source onto a mobile device such as a smart phone, and realizes a vibration function of the mobile device. Vibration actuator 10 is driven, for example, in a case of notifying a user of an incoming call or giving feeling of operation or sensation of reality.

Vibration actuator 10 illustrated in FIGS. 1 to 5 has movable body 60 that is disposed to freely reciprocate via elastic support portion 50 in case 32 of fixing body 20, elastic support portion 50, and fixing body 20. Vibration actuator 10 has a magnetic circuit configuration that causes movable body 60 to oscillate in cooperation with coil 48 and magnet 65 by coil 48 being electrically connected to a power supply section (not illustrated).

Although vibration actuator 10 of Embodiment has a so-called moving magnet type configuration where coil 48 is provided on a fixing body 20 side and magnet 65 is provided on a movable body 60 side, the invention is not limited thereto. A moving coil type configuration where coil 48 is provided in movable body 60 may be adopted.

Fixing body 20 of vibration actuator 10 has two units (upper fixing body 30 and lower fixing body 40), and movable body 60 and elastic support portion 50 are set as one movable unit 70. By assembling the three units into one, vibration actuator 10 is easily formed.

Fixing body 20 supports movable body 60 of movable unit 70 to be movable in a magnetization direction (which also corresponds to a coil axis direction in Embodiment), which is a sandwiched direction at this time, by the other end portion of elastic support portion 50 of movable unit 70 (outer peripheral bonding portion 502 illustrated in FIG. 12) being sandwiched between upper fixing body (first fixing body) 30 and lower fixing body (second fixing body) 40. The sandwiched direction corresponds to the vibration direction of movable body 60 in vibration actuator 10. In addition, elastic support portion 50 is a plate-shaped elastic body, and is a plate spring in Embodiment. Elastic support portion 50 has one end fixed to movable body 60, and is disposed in a radial direction from an outer periphery of movable body 60. Details of elastic support portion 50 will be described later.

<Upper Fixing Body 30>

Figure 6:
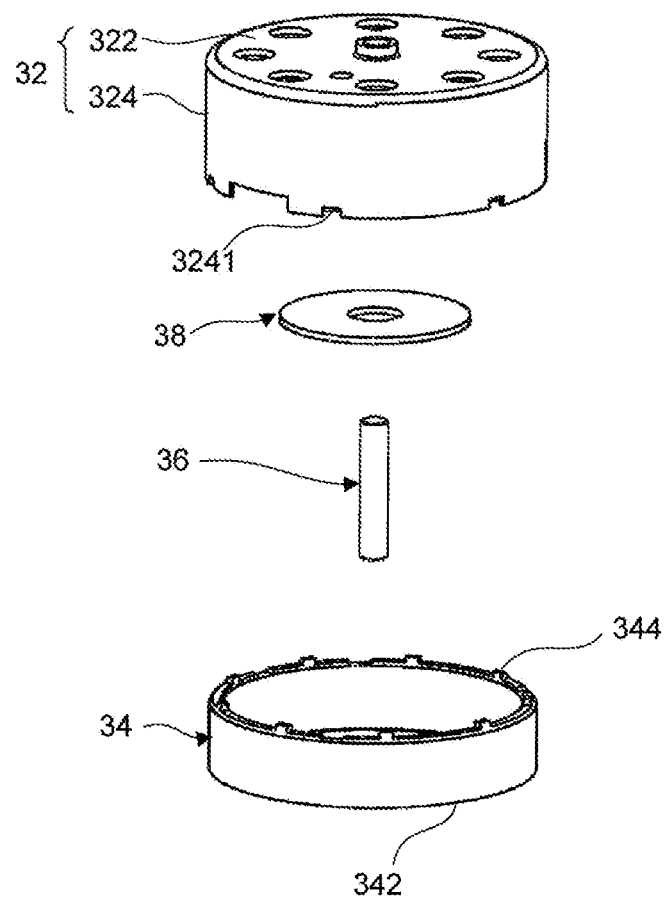
FIG. 6 is an upper surface side exploded perspective view of an upper fixing body of the vibration actuator.
Figure 7:
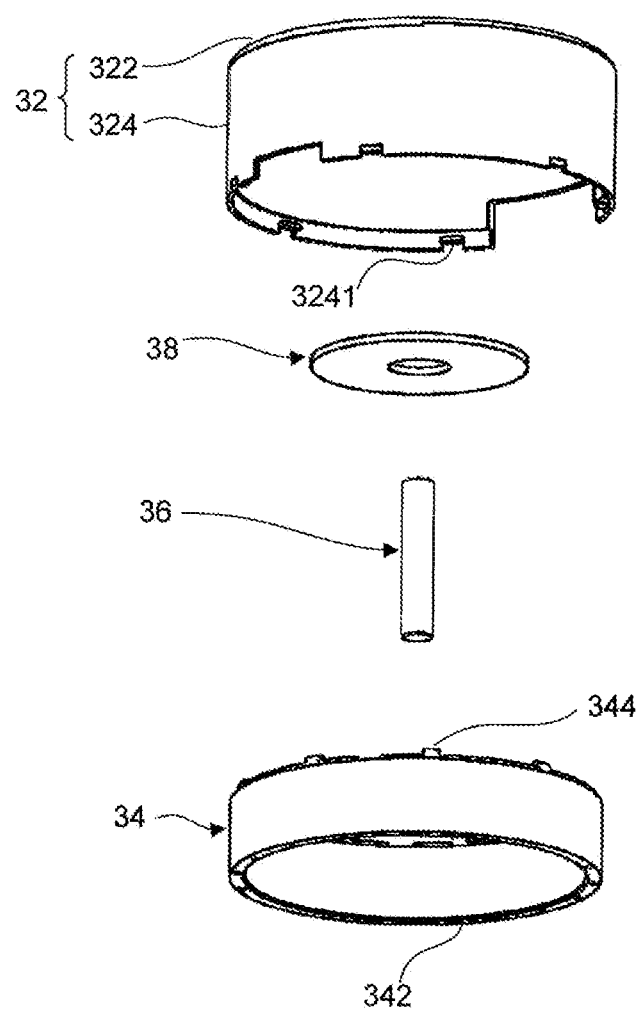
FIG. 7 is a bottom surface side exploded perspective view of the upper fixing body of the vibration actuator.

FIGS. 6 and 7 are an upper surface side exploded perspective view and a bottom surface side exploded perspective view of upper fixing body 30 of vibration actuator 10 according to Embodiment of the present invention.

Upper fixing body 30 is disposed on one side of the vibration direction to cover movable body 60.

As illustrated in FIGS. 3, 6, and 7, upper fixing body 30 has case 32, upper spring fixing portion 34, shaft 36, and shock absorbing member 38.

Case 32 configures an appearance of vibration actuator 10, and accommodates movable body 60 therein.

In Embodiment, case 32 configures a hollow cylindrical appearance with base plate 42 of lower fixing body 40, and accommodates movable unit 70, that is, elastic support portion 50 and movable body 60 therein.

Case 32 is configured of a metal material such as stainless steel (SUS) having shock resistance. Case 32 may be a metal plate molded in a recessed shape through drawing. Case 32 is preferably configured of a metal that is the same type as base plate 42 (for example, stainless steel (SUS) 304).

Case 32 has cylindrical peripheral wall portion 324 that hangs from an outer periphery of disk-shaped upper surface portion 322, and is engaged and fixed to an outer peripheral edge of base plate 42 by means of protruding claw portion 3241 provided at a lower end portion of peripheral wall portion 324. Claw portion 3241 is fixed to the outer peripheral edge of base plate 42 through swaging or welding, or through both of swaging and welding. Since case 32 and base plate 42 are configured of the same type of metal, the case and the base plate can be firmly fixed through swaging or welding in Embodiment. In particular, in a case of fixing through welding, melting points of both of case 32 and base plate 42 are the same. Thus, both can be more firmly fixed. Case 32 may be a magnetic body, or may be a magnetized body.

On the same axis as coil 48, shaft 36 is suspended in the middle of upper surface portion 322 of case 32.

Movable body 60 is configured to move along shaft 36. One end portion (an upper end portion, in Embodiment) of the shaft is fixed to upper surface portion 322, and the other end portion thereof is fixed to base plate 42 of lower fixing body 40.

Shaft 36 is fixed to each of upper surface portion 322 and base plate 42 through any bonding method such as adhesion, welding, and press-fitting. In Embodiment, shaft 36 may be fixed by being inserted into an opening portion formed in each of upper surface portion 322 and base plate 42 through any of adhesion, welding, and press-fitting, or at least two bonding methods. In addition, although shaft 36 is fixed to upper fixing body 30 in FIGS. 4 to 7, the shaft may be fixed to base plate 42 on a lower fixing body 40 side.

In case 32, one end portion (upper abutment portion 342) of upper spring fixing portion 34 abuts against elastic support portion 50 of movable unit 70 from an upper side of the vibration direction of movable body 60, and the other end side thereof is in contact with upper surface portion 322.

Specifically, upper spring fixing portion 34 is disposed on an inner peripheral surface of peripheral wall portion 324, and abuts against and presses outer peripheral bonding portion 502 by means of upper abutment portion 342. Outer peripheral bonding portion 502 is sandwiched and fixed between upper abutment portion 342 and coil holder (lower spring fixing portion) 44 of lower fixing body 40. Outer peripheral bonding portion 502 configures an outer peripheral edge of elastic support portion 50 as the other end portion of elastic support portion 50 of movable unit 70.

In addition, a plurality of protruding deflection portions 344 which are plastically deformable or elastically deformable are provided on the other end portion (upper end portion) of upper spring fixing portion 34, and the upper spring fixing portion abuts against upper surface portion 322 by means of deflection portions 344. When pressed in a direction where elastic support portion 50 is sandwiched between upper spring fixing portion 34 and coil holder 44, deflection portions 344 abut against a movable body accommodated side of upper surface portion 322 of case 32 and then deflect. Accordingly, the position of upper spring fixing portion 34 can be adjusted between upper surface portion 322 and elastic support portion 50 in case 32. That is, deflection portions 344 make the adjustment of a height dimension of upper spring fixing portion 34 that presses elastic support portion 50 possible.

In Embodiment, upper spring fixing portion 34 is formed of a deformable resin material. Between case 32 and base plate 42, elastic support portion 50 is reliably sandwiched between coil holder 44 and the upper spring fixing portion.

Shock absorbing member 38 is disposed between movable body 60 that moves and upper surface portion 322 of case 32, and comes into contact with movable body 60 at the time of a maximum amplitude of movable body 60. Shock absorbing member 38 is, for example, a damper formed of a sponge or the like, is formed in a ring shape, and is attached to the movable body accommodated side of upper surface portion 322 in a state where shaft 36 is inserted, in Embodiment. In a case where a movable amplitude of movable body 60 in vibration actuator 10 has increased, or when an external shock is applied, shock absorbing member 38 prevents a strange noise from occurring or each component from being damaged by a shock as a result of movable body 60 coming into contact with case 32.

<Lower Fixing Body 40>

Figure 8:
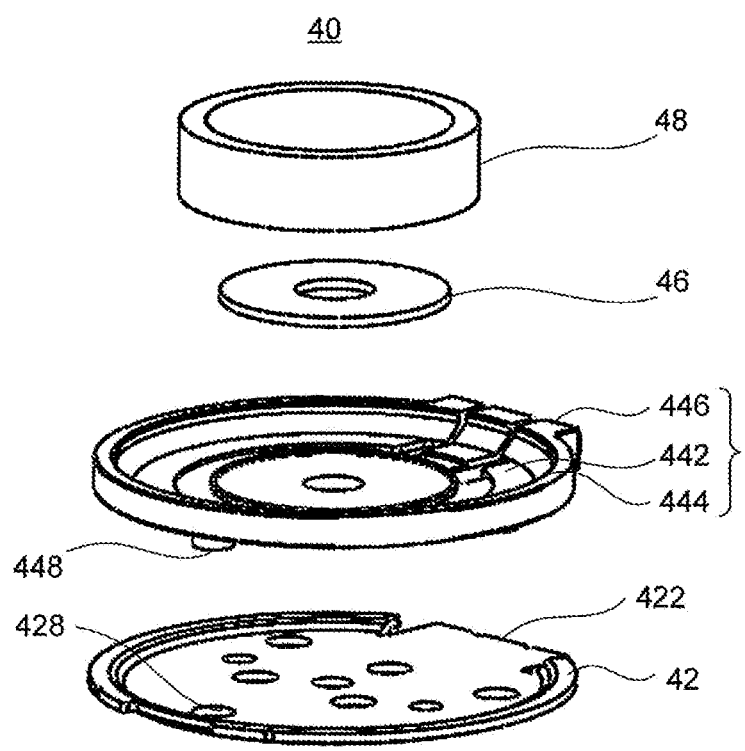
FIG. 8 is an upper surface side exploded perspective view of a lower fixing body of the vibration actuator.
Figure 9:
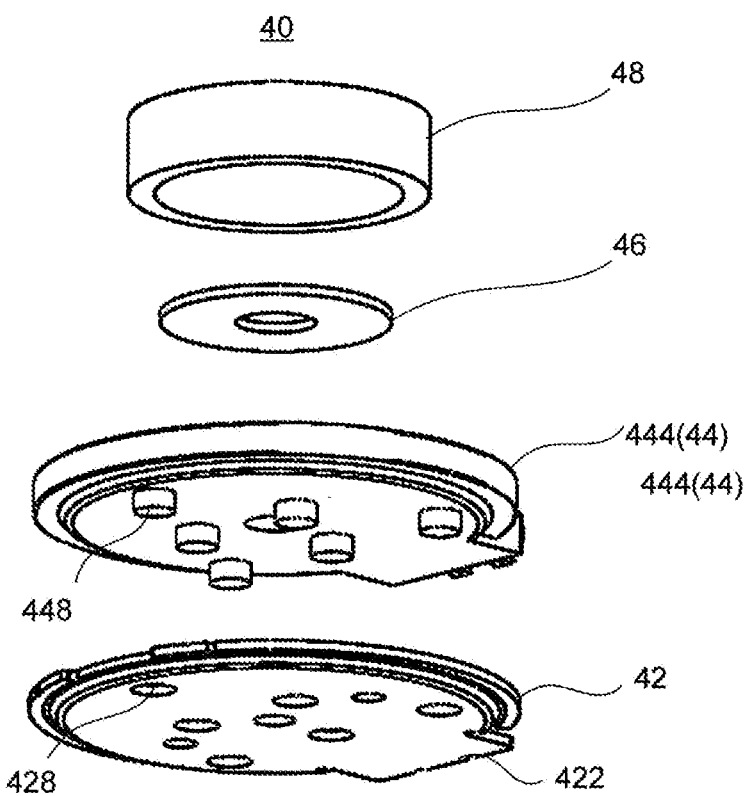
FIG. 9 is a bottom surface side exploded perspective view of the lower fixing body of the vibration actuator.

FIGS. 8 and 9 are an upper surface side exploded perspective view and a bottom surface side exploded perspective view of lower fixing body 40 of vibration actuator 10 according to Embodiment of the present invention.

Lower fixing body 40 is disposed on the other side (the lower side) of the vibration direction to cover movable body 60, and accommodates movable body 60 to be capable of vibrating by being bonded to upper fixing body 30.

In Embodiment, tubular coil 48 configuring the magnetic circuit with magnet 65 is provided in lower fixing body 40.

In addition to coil 48, lower fixing body 40 has base plate 42, coil holder 44, and shock absorbing member 46.

Base plate 42 configures a bottom surface portion of vibration actuator 10. Base plate 42 configures a housing of vibration actuator 10 with case 32.

Base plate 42 is formed in a disk shape corresponding to the shape of case 32, that is, the shape of an opening of peripheral wall portion 324 in case 32, and has a disk-shaped base main body part opposing upper surface portion 322. Protruding plate portion 422 which protrudes radially outward from a part of an outer periphery of the base main body part is provided.

Base plate 42 is configured of a metal material such as stainless steel (SUS) having shock resistance, and an engaged portion which is engaged with the lower end portion of peripheral wall portion 324 of case 32 is formed on an outer peripheral edge portion thereof. The lower end portion of peripheral wall portion 324 of case 32 is fixed to the engaged portion through one or both of swaging and welding. In Embodiment, base plate 42 is configured of the same type of metal (for example, stainless steel (SUS) 304) as case 32 as described above, and has a structure of being fixed to case 32 and being able to withstand internal vibration of movable body 60.

Coil 48 is provided on base plate 42 via coil holder 44.

Coil holder 44 holds coil 48, and magnet 65 is positioned on the same axis with a predetermined interval placed on a radially inner side of coil 48.

In addition, coil holder 44 abuts against elastic support portion 50 on the lower side, and functions as the lower spring fixing portion that causes elastic support portion 50 to be sandwiched between upper spring fixing portion 34 and the coil holder.

Coil holder 44 is a nonmagnetic body interposed between coil 48 and base plate 42. In addition, coil holder 44 is preferably configured of a nonconductive material such as a resin.

Accordingly, a configuration where coil holder (nonconductive portion) 44 made of a nonconductive material is disposed between base plate 42 and coil 48 is adopted. Coil 48 can be fixed to coil holder 44 in an electrically insulated state when assembling coil 48 into fixing body 20. In addition, even when coil holder 44 is a resin component and has a bobbin structure, ease of assembly can be achieved.

Coil holder 44 has disk-shaped holder main body 442, lower abutment portion 444 that abuts against elastic support portion 50, and leading portion 446 that leads wiring connected to coil 48.

Holder main body 442 has an outer diameter that is substantially the same as an inner diameter of case 32, and is formed in a disk shape to be inserted into case 32. Holder main body 442 is attached onto the base main body part of base plate 42. A coil fixing portion having a recessed shape to which coil 48 is fixed is provided in holder main body 442, and coil 48 is fixed to the coil fixing portion through adhesion or the like. In addition, shaft 36 to be inserted into an opening portion formed in a middle portion is fixed to holder main body 442.

Lower abutment portion 444 abuts against elastic support portion 50, and is provided to rise from an outer peripheral edge portion of holder main body 442. Herein, lower abutment portion 444 is formed in an annular peripheral wall shape. Accordingly, elastic support portion 50 is fixed to fixing body 20 at a position of separating away from holder main body 442. An interval between elastic support portion 50 (specifically, outer side bonding portion 502 of elastic support portion 50) and holder main body 442 is a movable range from a normal position of movable body 60 to the other side of the vibration direction.

Leading portion 446 leads the wiring connected to coil 48. Leading portion 446 is provided to protrude from one end portion of holder main body 442, and is disposed on protruding plate portion 422 of base plate 42. External power is supplied to coil 48 via the wiring of leading portion 446.

Coil holder 44 and base plate 42 overlap each other in a positioned state where a plurality of sets of positioning protrusion portions 448 and positioning recessed portions 428, which are respectively provided therein, are fitted to each other. For example, coil holder 44 is molded as a nonmagnetic body made of a resin which is a nonconductive material, and positioning recessed portions 428 of metal base plate 42 are through-holes, in Embodiment. Accordingly, positioning protrusion portions 448 on a coil holder 44 side are inserted and fitted to the through-holes which are positioning recessed portions 428, and inserted resin positioning protrusion portions 448 are melted and thereby can be easily fixed to the through-holes.

Shock absorbing member 46 is disposed between movable body 60 that moves and holder main body 442 of coil holder 44, and comes into contact with movable body 60 at the time of a maximum amplitude of movable body 60. The shock absorbing member is, for example, a damper formed of a sponge or the like, is formed in a ring shape, and is attached onto holder main body 442 in a state where shaft 36 is inserted, in Embodiment. In a case where a movable amplitude of movable body 60 in vibration actuator 10 has increased, or when an external shock is applied, shock absorbing member 46 prevents a strange noise from occurring or each component from being damaged by a shock as a result of movable body 60 coming into contact with base plate 42.

In assembled vibration actuator 10, coil 48 is used in generating a drive source of vibration actuator 10 with magnet 65 with an axial direction thereof (the magnetization direction of magnet 65) as the vibration direction. An axis of coil 48 is, for example, disposed on the same axis as at least the axis of magnet 65, out of those of magnet 65 and shaft 36 to be described later.

Both end portions of coil 48 are wired to leading portion 446, and are connected to the power supply section (not illustrated). Herein, both end portions of coil 48 wired to leading portion 446 are connected to an alternating current power supply section, and alternating current power (alternating current voltage) is supplied to coil 48 from the alternating current power supply section. Accordingly, thrust that allows coil 48 and the magnet to move with respect to each other in the axial directions of each other, that is, in a contact/separation direction can be generated. Specifically, an upper end portion of coil 48 is disposed to oppose a center part of magnet 65 on the radially inner side in the axial direction, and a center part of coil 48 in the axial direction is disposed to oppose center yoke 63. In a case where magnetization has occurred such that a flat plate core 614 side (the upper side, in Embodiment) and a center yoke 63 side of magnet 65 become an S-pole and an N-pole respectively, a magnetic flux, which is radiated from a bonding part between magnet 65 and center yoke 63 and is incident from the flat plate core 614 side, is formed. Therefore, the magnetic flux crosses from the radially inner side to the outer side of coil 48 with respect to any part of coil 48 disposed to surround magnet 65 and center yoke 63. Thus, the Lorentz force acts in the same direction (an F-direction or a –F-direction shown in FIG. 14) when electrically connected to coil 48.

<Movable Unit 70>

Figure 10:
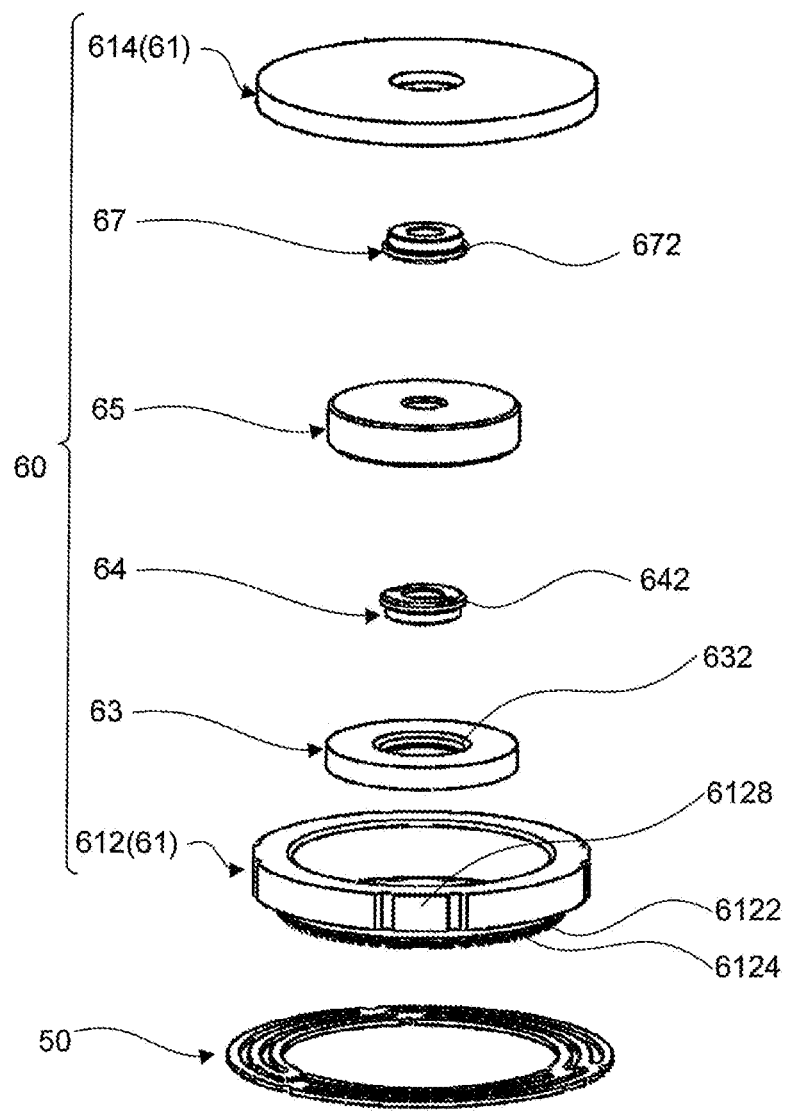
FIG. 10 is an upper surface side exploded perspective view of a movable unit of the vibration actuator.
Figure 11:
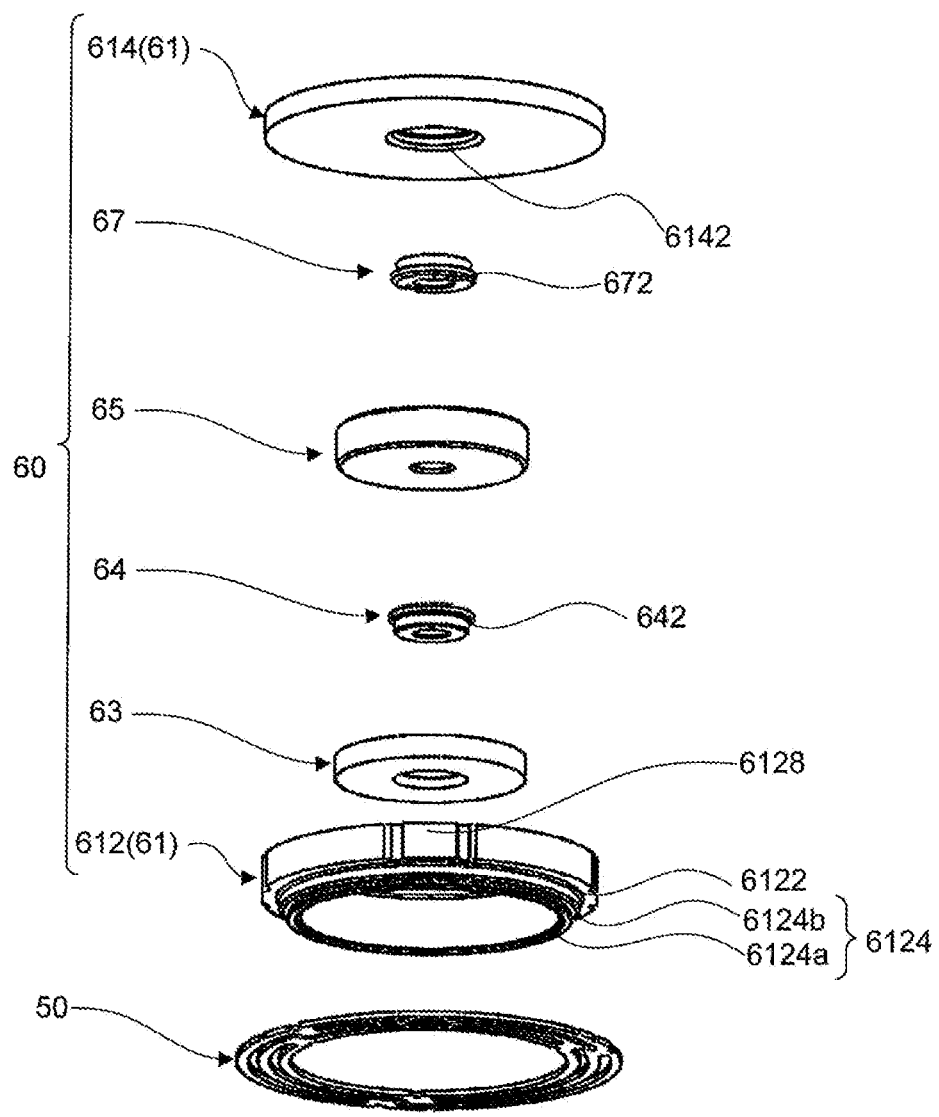
FIG. 11 is a bottom surface side exploded perspective view of the movable unit of the vibration actuator.

FIGS. 10 and 11 are an upper surface side exploded perspective view and a bottom surface side exploded perspective view of movable unit 70 of vibration actuator 10 according to Embodiment of the present invention.

Movable unit 70 has one of coil 48 and magnet 65. In Embodiment, movable unit 70 has magnet 65.

Movable unit 70 is supported by elastic support portion 50 to be able to reciprocate between upper surface portion 322 and base plate 42 in a direction where upper surface portion 322 and base plate 42 oppose each other, in case 32 and base plate 42 of fixing body 20.

Movable unit 70 is provided such that elastic support portion 50 radially projects from the outer periphery of movable body 60 formed in a disk shape, and an outer peripheral portion (outer peripheral bonding portion 502) of projecting elastic support portion 50 is fixed to fixing body 20 by being sandwiched between upper spring fixing portion 34 and coil holder 44.

In movable unit 70, elastic support portion 50 is fixed to an end portion of movable body 60 on the lower side (a coil 48 side).

Movable body 60 has movable portion core 61, center yoke 63, lower bearing 64, magnet 65, and upper bearing 67.

Movable portion core 61 is fixed to one of coil 48 and magnet 65, is disposed to surround both of coil 48 and magnet 65, and configures the outer periphery of movable body 60.

In Embodiment, movable portion core 61 is a magnetic body having a covered tubular shape, and functions as a yoke. Movable portion core 61 is configured of, for example, the same type of magnetic material as center yoke 63, and configures the magnetic circuit with coil 48, magnet 65, and center yoke 63. In addition, movable portion core 61 has ring core 612 and flat plate core (corresponds to a top surface portion) 614, and has a function of serving as a main body portion of movable body 60 as well as a function of serving as a weight, in movable body 60.

Movable portion core 61 is configured by fixing ring core 612 to annular plate-shaped flat plate core 614 having an opening portion into which shaft 36 is inserted at the center such that the movable portion core protrudes downwards from an outer peripheral portion of the flat plate core. Although the movable portion core is formed in a covered tubular shape with ring core 612 and flat plate core 614, without being limited thereto, the movable portion core may be configured to have an integral structure. However, in a case where movable portion core 61 has the integral structure, cutting is necessary, a large amount of materials are disposed, processing man-hours also increase, and costs increase. On the other hand, since movable portion core 61 of Embodiment is configured with assembling divided tubular ring core 612 and plate-shaped flat plate core 614 into one, it is possible to prepare the movable portion core through pressing, and cost reduction can be better achieved than the integral structure.

In movable portion core 61, specifically, in ring core 612, flat plate core 614, magnet 65, and center yoke 63 are disposed in turn such that respective opening portions in the middle are continuous on the same axis. Shaft 36 is inserted to the continuous opening portions to freely move.

Magnet 65 has the axial direction of coil 48 as the magnetization direction, and is disposed toward a magnetized surface. Magnet 65 is formed in a cylindrical shape, and is magnetized in two open directions, that is, the vibration direction (which is the axial direction of shaft 36 and corresponds to the axial direction of coil 48). In Embodiment, magnet 65 is disposed to be positioned on the radially inner side of coil 48 with the predetermined interval placed with respect to coil 48. The predetermined radial interval is an interval allowing magnet 65 and coil 48 to be movable with respect to each other such that the magnet and the coil are taken out or put in the magnetization direction. In Embodiment, magnet 65 is disposed such that an upper end surface of coil 48 of lower fixing body 40 is positioned at a center position of the magnet in the magnetization direction, as illustrated in FIG. 3. Magnet 65 may have any shape other than a cylindrical shape insofar as the magnet is disposed on the inner side of coil 48 to face each magnetized surface in the axial direction of coil 48.

Center yoke 63 is disposed to be in close contact with magnet 65, and a magnetic flux of magnet 65 is concentrated and thereby efficiently passes without leaking out. In Embodiment, center yoke 63 is positioned on the inner side of coil 48 to oppose, in a direction orthogonal to the axial direction, a middle part of coil 48 in the axial direction (the vibration direction).

Lower bearing 64 and upper bearing 67 are fitted in opening portions in the middle of center yoke 63 and flat plate core 614 respectively.

Shaft 36 is inserted in each of lower bearing 64 and upper bearing 67 in the axial direction to freely move, and movable body 60 itself is made to smoothly and freely move in the vibration direction along shaft 36.

Lower bearing 64 and upper bearing 67 are disposed in center yoke 63 and flat plate core 614 such that magnet 65 is sandwiched therebetween in the axial direction, that is, the vibration direction.

Lower bearing 64 and upper bearing 67 are respectively formed in a tubular shape, and outer peripheries of end portions on a magnet 65 side are provided to protrude in the radial direction in a flange shape and configure retaining portions 642 and 672 respectively.

When lower bearing 64 is inserted (herein, press-fitted) in the opening portion of center yoke 63, retaining portion 642 engages with step portion 632 having a recessed shape, which is formed on a surface of the opening portion of center yoke 63 on the magnet 65 side.

Accordingly, lower bearing 64 is disposed in a state of being sandwiched between center yoke 63 and magnet 65, and does not come off center yoke 63 in response to sliding along shaft 36, an external shock, or driving of vibration actuator 10. In addition, the lower bearing does not come off at the time of assembly and even when a designed dimension error occurs.

When upper bearing 67 is inserted (herein, press-fitted) in the opening portion of flat plate core 614, retaining portion 672 engages with step portion 6142 having a recessed shape, which is formed in flat plate core 614.

Accordingly, upper bearing 67 is disposed in a state of being sandwiched between flat plate core 614 and magnet 65, and does not come off flat plate core 614 in response to sliding along shaft 36, an external shock, or driving of vibration actuator 10. In addition, the lower bearing does not come off at the time of assembly and even when a designed dimension error occurs.

As described above, lower bearing 64 and upper bearing 67 respectively have retaining portions 642 and 672 which are on the side of magnet 65 disposed to be sandwiched therebetween, that is, a center side of movable body 60. Since retaining portions 642 and 672 of lower bearing 64 and upper bearing 67 engage with step portions 632 and 6142 of center yoke 63 and flat plate core 614 respectively, lower bearing 64 and upper bearing 67 in movable body 60 are disposed in a retained state.

Ring core 612 is a tubular body, and is bonded to elastic support portion 50 in Embodiment. Specifically, bonded end portion 6124 of ring core 612, which is an end portion on a bottom surface side, that is, a reverse side with respect to flat plate core 614, is bonded to elastic support portion 50. In Embodiment, bonded end portion 6124 is a lower end portion of ring core 612 which is open, is annularly formed in a circumferential direction along an opening edge portion, and bonds and fixes elastic support portion 50. Bonded end portion 6124 has tubular swaging claw portion 6124a protruding in an opening direction, herein downwards, and fixing stepped surface 6124b which is on a base end portion side of swaging claw portion 6124a and is orthogonal to swaging claw portion 6124a.

In a part of an outer peripheral surface of ring core 612, flat surface portion 6128 is provided at a symmetrical position with respect to the center of ring core 612. Flat surface portion 6128 is a part that can reliably sandwich cylindrical ring core 612 therein by means of a fixing jig that fixes an object by sandwiching the object therein. Even when ring core 612 is cylindrical, ring core 612 can be reliably fixed by flat surface portion 6128 causing the fixing jig to easily sandwich the ring core therein when bonding bonded end portion 6124 to inner peripheral bonding portion 506 of elastic support portion 50. For example, this process can be stably performed when fixing bonded end portion 6124 to inner peripheral bonding portion 506 of elastic support portion 50 through swaging (so-called, deforming).

Ring core 612 is disposed to be adjacent to an outer periphery of a vicinity of a bonding part with elastic support portion 50, herein, bonded end portion 6124, and has notched escape portion 6122 for avoiding interference of elastic support portion 50 at the time of deformation.

In ring core 612, swaging claw portion 6124a and fixing stepped surface 6124b of bonded end portion 6124 are provided on a lower end side of escape portion 6122.

Escape portion 6122 escapes and avoids interference of elastic support portion 50 when movable body 60 moves to a base plate 42 side. Since elastic support portion 50 is bonded to a lower end portion (bonded end portion 6124) of movable body 60, movable body 60 moves in a direction of separating away from the deformed part of elastic support portion 50 even when movable body 60 moves to the flat plate core 614 side. Thus, the escape portion at that time is unnecessary.

A length of escape portion 6122 in the axial direction, that is, the vibration direction is set by elastic support portion 50 bonded to an opening end portion of escape portion 6122 on one end side (herein, the lower end side), specifically, a movable range of the spring.

A length of escape portion 6122 in the vibration direction (an opening range) is set to the movable range of the plate spring which is elastic support portion 50, that is, a length of ½ to ⅔ of a movable range of movable body 60 (also referred to as an "escape dimension" which is a dimension for avoiding interference of elastic support portion 50 at the time of deformation). By setting the escape dimension to ½ to ⅔ of the movable range, the vibration actuator can be driven in a state where the mass of movable body 60 is maintained without the interference of the plate spring, which is elastic support portion 50.

Figure 12:
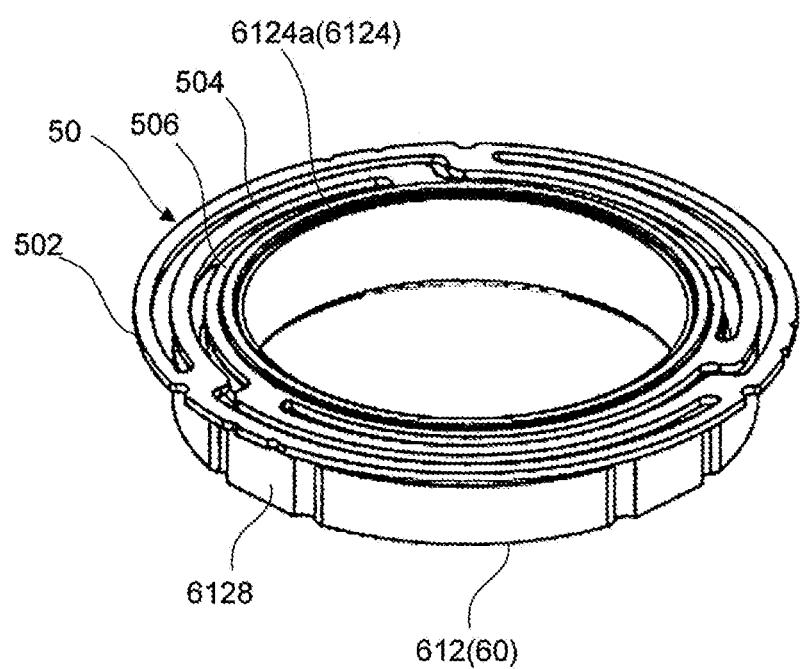
FIG. 12 is a perspective view illustrating a bonding portion between an elastic support portion and a ring core of the movable body.
Figure 13A:
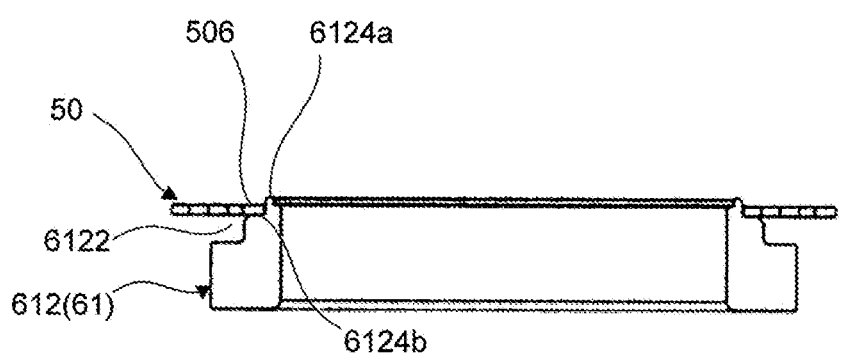
FIG. 13A is a view illustrating a state where an annular inner peripheral bonding portion is fitted in a bonded end portion of the ring core.
Figure 13B:
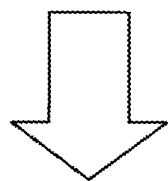
FIG. 13B is a view illustrating a state where the annular inner peripheral bonding portion is bonded to the ring core.
Figure 13B:
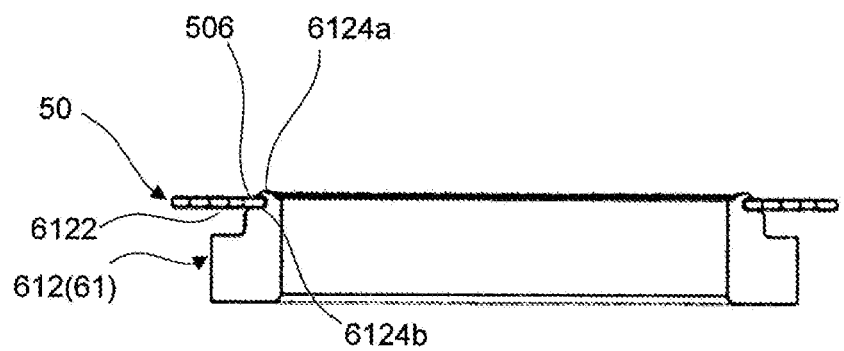

FIG. 12 is a perspective view illustrating a bonding portion between elastic support portion 50 and ring core 612 of movable body 60. FIGS. 13A and 13B are views provided for illustrating the bonding portion between elastic support portion 50 and ring core 612 of movable body 60. FIG. 13A illustrates a state where annular inner peripheral bonding portion 506 is fitted in bonded end portion 6124 of ring core 612. FIG. 13B illustrates a state where annular inner peripheral bonding portion 506 is bonded to ring core 612. First, elastic support portion 50 will be described with reference to FIG. 12.

Outer peripheral bonding portion 502 which is the other end portion on an outer peripheral side and inner peripheral bonding portion 506 which is one end portion on an inner peripheral side in elastic support portion 50 can be displaced in a thickness direction in response to elastic deformation. Elastic support portion 50 is disposed to be orthogonal to a movement direction of movable body 60 (herein, in a horizontal direction) at normal times.

Specifically, elastic support portion 50 is a ring-shaped plate spring having an opening in the middle, and has outer peripheral bonding portion 502 disposed on the outer peripheral side, inner peripheral bonding portion 506 disposed on the inner peripheral side, and arm portion 504 that connects outer peripheral bonding portion 502 to inner peripheral bonding portion 506.

In Embodiment, outer peripheral bonding portion 502 and inner peripheral bonding portion 506 in elastic support portion 50 are respectively formed in an annular shape, and are disposed with an interval placed. Arcuate arm portion 504 disposed within the interval elastically deforms with both end portions of arm portion 504 being connected to outer peripheral bonding portion 502 and inner peripheral bonding portion 506 respectively. Mainly in response to the elastic deformation of arm portion 504, outer peripheral bonding portion 502 and inner peripheral bonding portion 506 are freely displaced in the thickness direction. Displaced amounts of outer peripheral bonding portion 502 and inner peripheral bonding portion 506 can be adjusted in accordance with a length of arm portion 504.

As illustrated in FIG. 3, elastic support portion 50 is bonded to movable body 60 with inner peripheral bonding portion 506 on the inner peripheral side, and is fixed to fixing body 20 with outer peripheral bonding portion 502 on the outer peripheral side.

Annular inner peripheral bonding portion 506 of elastic support portion 50 is bonded by being fitted onto bonded end portion 6124 (specifically, swaging claw portion 6124a) of ring core 612, and is fixed to extend from ring core 612 to a radially outer side of ring core 612.

Although welding, adhesion, or the like may be used in bonding elastic support portion 50 to ring core 612, the other end portion of elastic support portion 50 is bonded by being fitted onto swaging claw portion 6124a of ring core 612 and thereby swaging swaging claw portion 6124a in Embodiment as illustrated in FIGS. 13A and 13B.

Specifically, as illustrated in FIG. 13A, inner peripheral bonding portion 506 of elastic support portion 50 is fitted onto lower end portion 6124 of ring core 612, thereby being positioned on annular fixing stepped surface 6124b.

Next, by striking or tightening swaging claw portion 6124a, inner peripheral bonding portion 506 is sandwiched between fixing stepped surface 6124b and the swaging claw portion and is firmly fastened, as illustrated in FIG. 13B.

Accordingly, inner peripheral bonding portion 506 is reliably fixed by swaging the entire periphery of ring core 612. Consequently, in a case where adhesion is used, the inner peripheral bonding portion does not come off even when a force that causes the inner peripheral bonding portion to come off at the time of driving is applied. In addition, unlike a case where welding is used, it is not necessary to provide a space for welding in each component of movable body 60 or elastic support portion 50. Accordingly, design freedom of the plate spring which is elastic support portion 50 does not reduce in order to secure this space.

In this manner, the plate spring which is elastic support portion 50 and movable body 60 can be firmly connected to each other, and design freedom of elastic support portion 50 can be increased.

Figure 14:
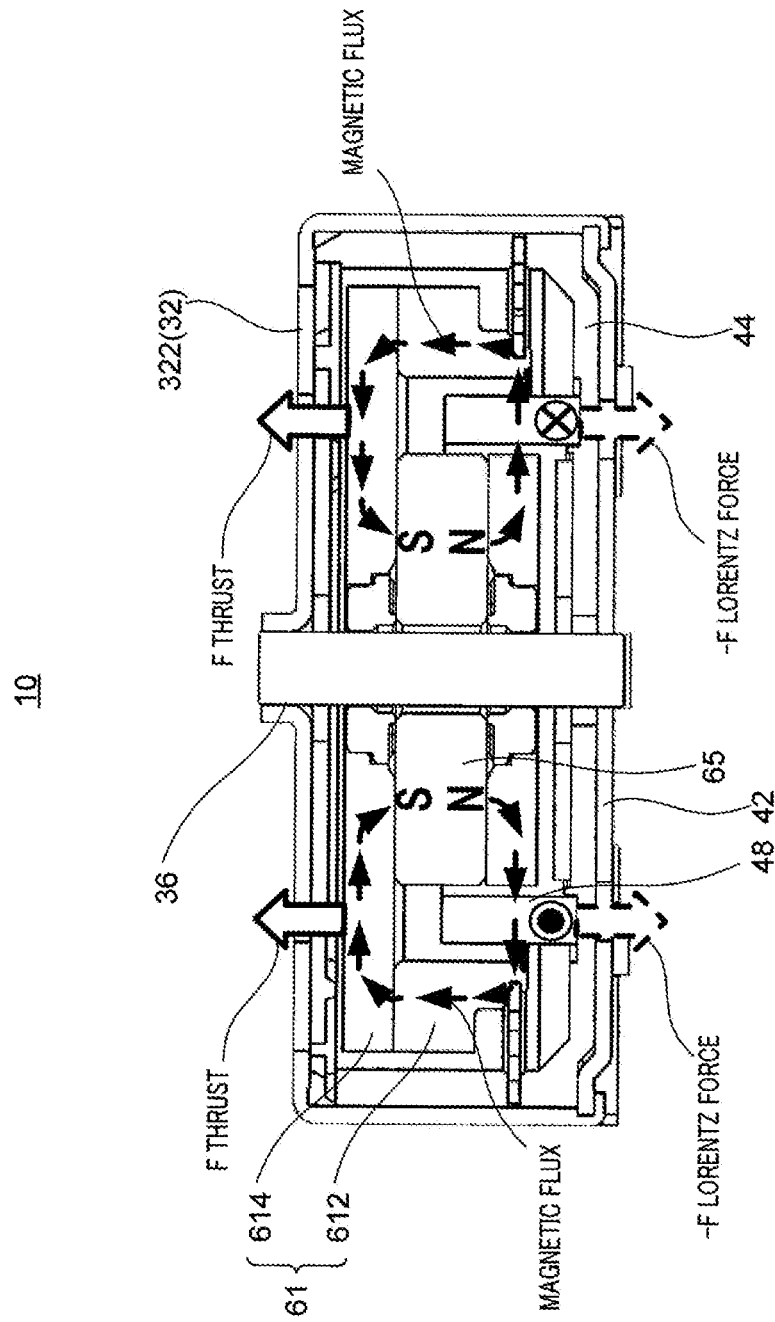
FIG. 14 is a sectional view illustrating a magnetic circuit configuration of the vibration actuator.

The magnetic circuit illustrated in FIG. 14 is formed in vibration actuator 10. In addition, coil 48 is disposed, in vibration actuator 10, to be orthogonal to a magnetic flux from magnet 65 and center yoke 63 of movable body 60. Therefore, when electrical connection is performed as illustrated in FIG. 14, the Lorentz force in the −F-direction is generated in coil 48 in accordance with Fleming's left hand rule in response to interaction between a magnetic field of magnet 65 and a current flowing in coil 48.

A direction of the Lorentz force in the −F-direction is a direction orthogonal to a direction of the magnetic field and a direction of the current flowing in coil 48 (the base plate 42 side in FIG. 14). Since coil 48 is fixed on the base plate 42 side (coil holder 44, which is a lower fixing portion), an opposite force to the Lorentz force in the −F-direction is generated as thrust in the F-direction in movable body 60 having magnet 65 according to the law of action-reaction, and a movable body side where there is magnet 65 moves to the F-direction, that is, the flat plate core 614 (upper fixing body 30) side. Movable body 60 is driven in accordance with a drive signal, and comes into contact with (specifically, collides with) shock absorbing member 38 when the movable body has moved in the −F-direction depending on drive conditions.

In addition, when an electrical connection direction of coil 48 is switched to a reverse direction and then electrical connection to coil 48 is performed, the Lorentz force in the F-direction, which is the reverse direction, is generated. In response to the generation of the Lorentz force in the F-direction, an opposite force to the Lorentz force in the F-direction is generated as thrust (thrust in the −F-direction) in movable body 60 according to the law of action-reaction, and movable body 60 moves in the −F-direction, that is, the base plate 42 (lower fixing body 40) side. Movable body 60 is driven in accordance with a drive signal, and comes into contact with (specifically, collides with) shock absorbing member 46 when the movable body has moved in the −F-direction depending on drive conditions.

Vibration actuator 10 has fixing body 20 having coil 48 and magnet 65 which is magnetized in the axial direction (AL) of coil 48 and is disposed on the radially inner side of coil 48, and includes movable body 60 movably disposed on the inner side of coil 48 in the axial direction of coil 48 in a state of being elastically held by elastic support portion 50.

In vibration actuator 10, outer peripheral bonding portion 502 of elastic support portion 50 which is the plate spring having inner peripheral bonding portion 506 fixed to movable body 60 is fixed by being sandwiched between upper fixing body 30 and lower fixing body 40 which configure fixing body 20. Accordingly, in a state of being separated away from a top surface (flat plate core 614) and a bottom surface (base plate 42) of vibration actuator 10, elastic support portion 50 supports movable body 60 to freely move.

Accordingly, since movable unit 70 having movable body 60 is fixed inside the housing of fixing body 20 formed with case 32 and base plate 42 by being sandwiched between upper spring fixing portion 34 and coil holder 44, desired vibration is obtained, ease of assembly is good, a structure is simple, and process cost reduction can be achieved. In addition, since shaft 36 is included, shock resistance is further enhanced, and vibration that is actually felt can be sufficiently obtained.

Herein, vibration actuator 10 is driven by an alternating current wave input from the power supply section (not illustrated) to coil 48. That is, the electrical connection direction of coil 48 is periodically switched, and thrust in the F-direction of the flat plate core 614 side and thrust in the F-direction on the base plate 42 side alternately act on movable body 60. Accordingly, movable body 60 vibrates in a winding axis direction of coil 48, that is, an extension direction of shaft 36.

Hereinafter, a driving principle of vibration actuator 10 will be briefly described. In vibration actuator 10 of Embodiment, in a case where the mass of movable body 60 is indicated with m (kg), and a spring constant of the spring (the plate spring) in a torsional direction is indicated with $K_{sp}$, movable body 60 vibrates with respect to fixing body 20 at resonant frequency $f_r$ (Hz) calculated by following equation 1.

(Equation 1)

$$f_r = \frac{1}{2\pi}\sqrt{\frac{K_{sp}}{m}} \quad [1]$$

When an alternating current wave having a frequency equal to resonant frequency $f_r$ of movable body 60 is input into coil 48, movable body 60 comes into a resonance state since movable body 60 is considered to configure a mass part in a vibration model of a spring-mass system. That is, by inputting the alternating current wave having the frequency which is substantially equal to resonant frequency $f_r$ of movable body 60 from the power supply section into coil 48, movable body 60 can be efficiently vibrated.

An equation of motion and a circuit equation expressing the driving principle of vibration actuator 10 are as follows. Vibration actuator 10 is driven based on the equation of motion expressed as following equation 2 and the circuit equation expressed as following equation 3.

(Equation 2)

$$m\frac{d^2x(t)}{dt^2} = K_f i(t) - K_{sp}x(t) - D\frac{dx(t)}{dt} \quad [2]$$

m: mass (kg)
x(t): displacement (m)
$K_f$: thrust constant (N/A)
i(t): current (A)
$K_{sp}$: spring constant (N/m)
D: damping coefficient (N/(m/s))

(Equation 3)

$$e(t) = Ri(t) + L\frac{di(t)}{dt} + K_e\frac{dx(t)}{dt} \quad [3]$$

e(t): voltage (V)
R: resistance (Ω)
L: inductance (H)
$K_e$: back electromotive force constant (V/(rad/s))

That is, mass m (kg), displacement x(t) (m), thrust constant $K_f$ (N/A), current i(t) (A), spring constant $K_{sp}$ (N/m), and damping coefficient D (N/(m/s)) in vibration actuator 10 can be modified as appropriate within a range that equation 2 is satisfied. In addition, voltage e(t) (V), resistance R (Ω), inductance L (H), and back electromotive force constant $K_e$ (V/(rad/s)) can be modified as appropriate within a range that equation 3 is satisfied.

In this manner, in a case where electrical connection to coil 48 is performed by an alternating current wave corresponding to resonant frequency $f_r$ determined by mass m of movable body 60 and spring constant $K_{sp}$ of elastic support portion 50 which is the plate spring, a large vibration output can be efficiently obtained in vibration actuator 10.

In addition, vibration actuator 10 satisfies equations 2 and 3, and is driven in response to resonance in which a resonant frequency expressed in equation 1 is used. Accordingly, power consumed in a stationary state is only a loss caused by load torque and a loss caused by friction in vibration actuator 10, and thereby movable body 60 can be driven with low power consumption, that is, can be linearly oscillated with low power consumption.

According to Embodiment, vibration actuator 10 can be assembled by elastic support portion 50 of movable unit 70 being sandwiched between upper fixing body 30 having upper spring fixing portion 34 and lower fixing body 40 having coil holder 44. That is, after assembling upper fixing body 30, lower fixing body 40, and movable unit 70 into one in advance at the time of assembly, vibration actuator 10 can be assembled by simply assembling the portions into one.

According to Embodiment, a plurality of deflection portions (protrusions) 344 are provided on the other end portion (the upper end portion) of upper spring fixing portion 34 that causes outer peripheral bonding portion 502 of elastic support portion 50 to be sandwiched between one end portion (a lower end portion) and coil holder 44. Accordingly, at the time of assembly of vibration actuator 10, it is possible to adjust a height dimension by deflection portions 344 deflecting. That is, deflection portions 344 deflect even in a case where a component (for example, coil holder 44) protrudes to the outer side due to a cumulative tolerance of each component when putting outer peripheral bonding portion 502 of elastic support portion 50 projecting from an outer peripheral part of movable unit 70 into case 32 by the outer peripheral bonding portion being sandwiched between upper spring fixing portion 34 and coil holder 44 at the time of assembly of vibration actuator 10. Therefore, the components can be suitably accommodated and assembled into one, it is not necessary to forcibly perform assembly, and case 32 does not deform.

In addition, there is a possibility that the elastic support portion which deforms at the time of movement of the movable body interferes with the movable body in a configuration where the elastic support portion is disposed between the cylindrical movable body and the fixing body disposed to surround the outer periphery thereof and is attached to both of the cylindrical movable body and the fixing body, which is a configuration of the actuator.

On the other hand, in vibration actuator 10 of Embodiment, elastic support portion 50 is bonded to one end portion of movable body 60 in the vibration direction, herein, bonded end portion 6124 which is the lower end portion, and escape portion 6122 is provided to be adjacent to bonded end portion 6124. Accordingly, even when movable body 60 moves and is displaced in the vibration direction, elastic support portion 50 which supports the movable body by deforming this displaced state does not interfere with movable body 60.

In addition, this escape portion 6122 is formed to be depressed at a length of ½ to ⅔ of the movable range of movable body 60 in the vibration direction (the axial direction of coil 48). Accordingly, vibration output reduction can be prevented by securing suitable mass in the movable range of movable body 60 without making the mass of ring core 612 which is a part of movable portion core 61 small more than it needs to be in order to form escape portion 6122.

In addition, vibration actuator 10 of Embodiment can be used in an electric beauty equipment such as a facial massage machine that requires vibration, in addition to the aforementioned mobile device.

The present invention can be changed in various ways without departing from the spirit of the present invention, and it is evident that the present invention includes the changes. For example, bonding of bonded end portion 6124 to elastic support portion 50 is not limited to swaging of swaging claw portion 6124a, fixing by applying an adhesive to a contact area between bonded end portion 6124 and elastic support portion 50 or a vicinity thereof, fixing by welding, and fixing by causing elastic support portion 50 to be sandwiched between bonded end portion 6124 and another member may be adopted.

INDUSTRIAL APPLICABILITY

The vibration actuator according to the present invention is easily assembled with a simple configuration, functions as a vibration generation source which exhibits desired vibration output, and is useful as an actuator mounted onto a mobile device that gives vibration to a user.

REFERENCE SIGNS LIST

10 Vibration actuator
20 Fixing body
30 Upper fixing body (First fixing body)
32 Case
34 Upper spring fixing portion (Abutment portion)
36 Shaft
38 Shock absorbing member
40 Lower fixing body (Second fixing body)
42 Base plate
44 Coil holder (Lower spring fixing portion, second fixing body)
46 Shock absorbing member
48 Coil
50 Elastic support portion
60 Movable body
61 Movable portion core
63 Center yoke
64 Lower bearing
65 Magnet
67 Upper bearing
70 Movable unit
322 Upper surface portion
324 Peripheral wall portion
342 Upper abutment portion
344 Deflection portion (Protrusion)
422 Protruding plate portion
428 Positioning recessed portion
442 Folder main body
444 Lower abutment portion
446 Leading portion
448 Positioning protrusion portion
502 Outer peripheral bonding portion
504 Arm portion
506 Inner peripheral bonding portion
612 Ring core
614 Flat plate core
632 Step portion
642, 672 Retaining portion
3241 Claw portion
6122 Escape portion
6124 Bonded end portion (Lower end portion)
6124a Swaging claw portion
6124b Fixing stepped surface
6128 Flat surface portion
6142 Step portion

What is claimed is:
1. A vibration actuator, comprising:
a movable body including a magnet disposed on a radially inner side of a coil while being spaced from the coil;
a fixing body including the coil; and
an elastic support portion supporting the movable body in such a way that the movable body is freely movable with respect to the fixing body,
wherein the movable body vibrates with respect to the fixing body in a magnetization direction of the magnet in cooperation with the coil to which power is supplied and the magnet, wherein:
the elastic support portion is a plate-shaped elastic body that includes one end portion fixed to the movable body and is provided to protrude from an outer periphery of the movable body in a radial direction,
the fixing body includes:
a housing accommodates the movable body in such a way that the movable body is capable of vibrating and includes an upper surface portion that is disposed on one side in a vibration direction with respect to the movable body, a lower surface portion that is disposed on the other side in the vibration direction with respect to the movable body, and a peripheral wall portion that surrounds the movable body and extends from the upper surface portion to the lower surface portion, and
a first spring fixing portion and a second spring fixing portion that are disposed on the one side and the other side in the vibration direction relative to each other along an inner surface of the peripheral wall portion inside the housing and cooperate with each other to fix the other end of the elastic support portion while being sandwiched between the first spring fixing portion and the second spring fixing portion,
the first spring fixing portion is a separate body from the housing,
one end of the first spring fixing portion on the one side in the vibration direction is positioned based on the housing,
the other end of the first spring fixing portion on the other side in the vibration direction is positioned based on the second spring fixing portion, and
the one end portion of the first spring fixing portion includes a plurality of protrusions that are to be in contact with the upper surface portion and deformable.

2. The vibration actuator according to claim 1,
wherein the fixing body includes a shaft that is inserted into the movable body and supports the movable body in such a way that the movable body is movable in the vibration direction, and
the shaft is fixed to the upper surface portion and the lower surface portion respectively on sides of both end portions of the shaft.

3. The vibration actuator according to claim 2,
wherein the upper surface portion is a metal case,
the lower surface portion is disposed opposite to the upper surface portion, and
the shaft is fixed to the lower surface portion and the upper surface portion through at least one of press-fitting and welding.

4. The vibration actuator according to claim 3,
wherein the peripheral wall portion is fixed to the lower surface portion plate through at least one of swage fixing and welding fixing.

5. The vibration actuator according to claim 3,
wherein a shock absorbing member that buffers contact with the movable body is provided on each of the upper surface portion and the lower surface portion opposite to the movable body.

6. The vibration actuator according to claim 1,
wherein the upper surface portion is a metal case,
the lower surface portion is a metal base plate, and
the coil is provided on or above the lower surface portion via a nonconductive portion.

* * * * *